United States Patent [19]
Ginaven

[11] 3,939,075
[45] Feb. 17, 1976

[54] THICKENING APPARATUS

[75] Inventor: Marvin E. Ginaven, Springfield, Ohio

[73] Assignee: The Bauer Bros. Co., Springfield, Ohio

[22] Filed: Nov. 10, 1972

[21] Appl. No.: 305,547

Related U.S. Application Data

[63] Continuation of Ser. No. 81,980, Oct. 19, 1970, abandoned.

[52] U.S. Cl. ............... 210/258; 210/336; 210/416; 210/443; 210/499
[51] Int. Cl.² ......................................... B01D 35/00
[58] Field of Search ............ 210/65, 433, 435, 443, 210/499, 532, 533, 535, 252, 253, 258; 209/250, 268, 273, 274; 210/84, 409, 336; 162/56, 232; 100/110

[56] References Cited
UNITED STATES PATENTS

| | | | |
|---|---|---|---|
| 1,174,784 | 3/1916 | Wasson | 210/336 |
| 3,423,313 | 1/1969 | Messer | 210/433 |
| 3,452,876 | 7/1969 | Ginaven | 210/433 |
| 3,581,900 | 6/1971 | Clark | 210/433 |
| 3,591,493 | 7/1971 | Zeineh | 210/433 |
| 3,643,805 | 2/1972 | Hoffman | 210/433 |
| 3,754,658 | 8/1973 | Messing | 210/443 |

FOREIGN PATENTS OR APPLICATIONS

| | | | |
|---|---|---|---|
| 441,878 | 12/1946 | Italy | 210/336 |
| 134,917 | 9/1901 | Germany | 210/336 |

Primary Examiner—Charles N. Hart
Assistant Examiner—F. F. Calvetti
Attorney, Agent, or Firm—Jerome P. Bloom

[57] ABSTRACT

Separating and thickening apparatus, particularly advantageous for use in processing pulp, characterized by an apertured duct preferably of U-shape and rectangular cross-section. The duct is distinguished by closely spaced walls and incorporates removable screen segments which are readily accessible and easily replaced. The apparatus is so contrived to enable a highly efficient, high capacity, dewatering or thickening structure which requires no moving parts.

13 Claims, 5 Drawing Figures

U.S. Patent  Feb. 17, 1976  3,939,075
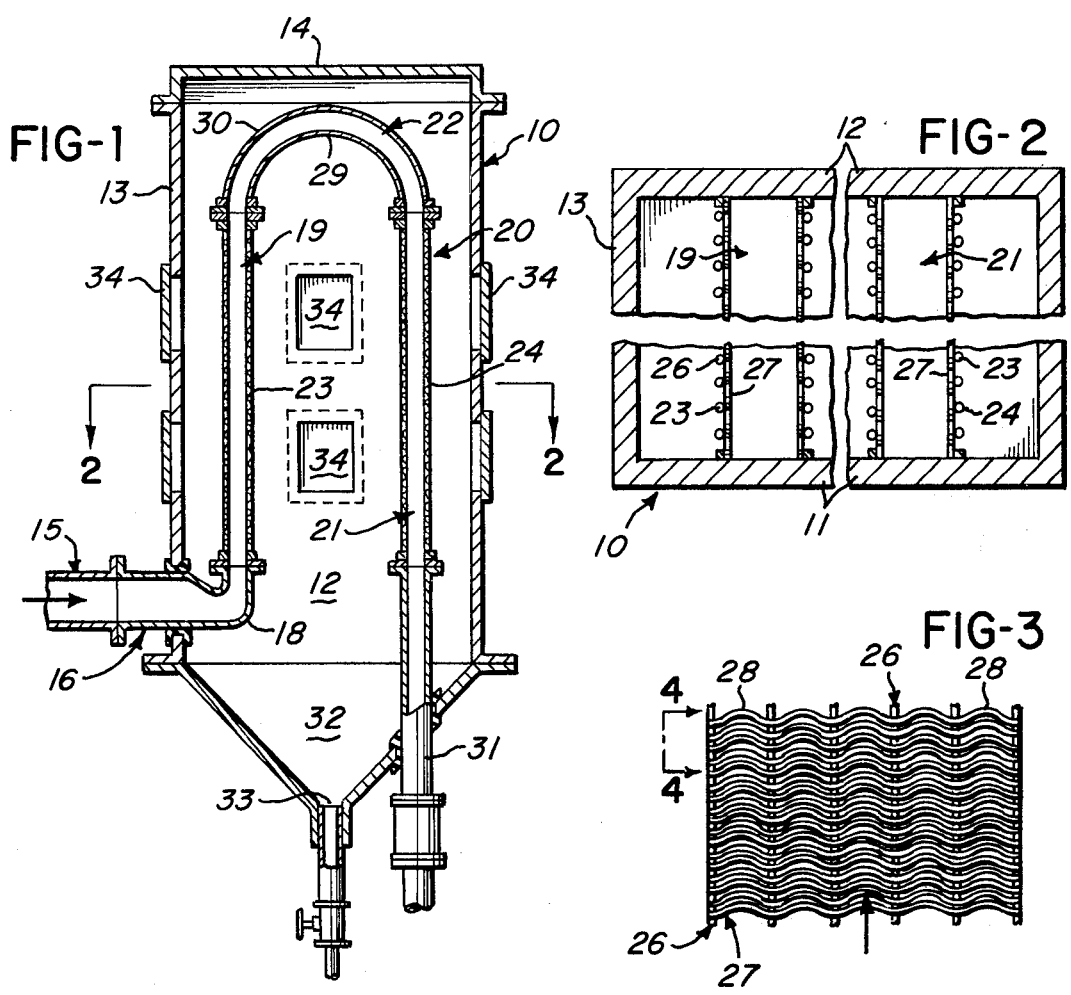
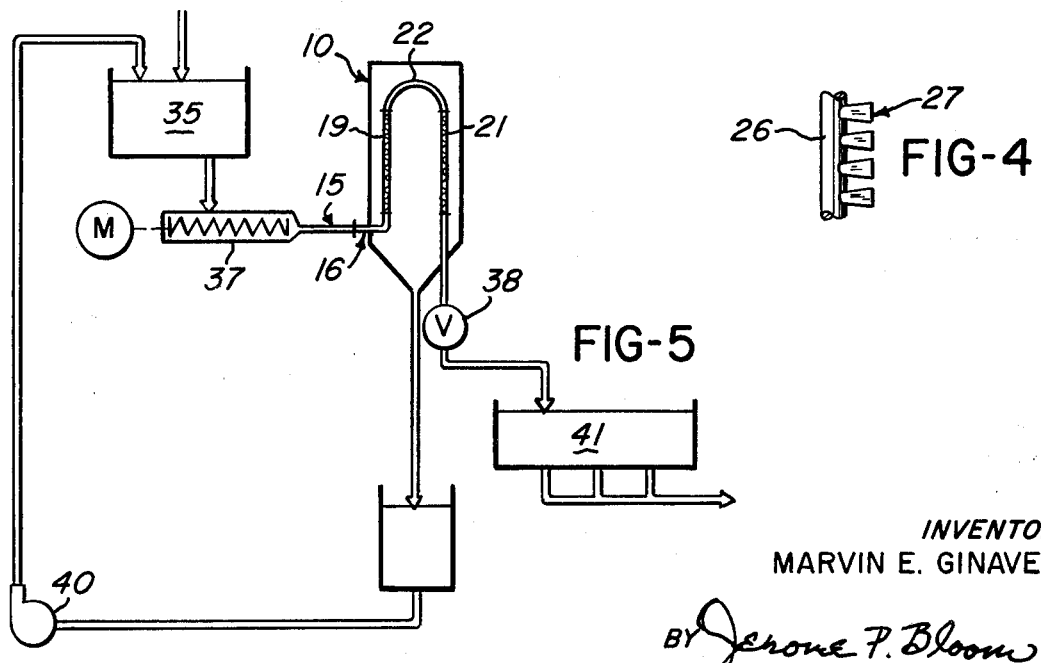
INVENTOR
MARVIN E. GINAVEN
BY Jerome P. Bloom
ATTORNEY

THICKENING APPARATUS

This application is a continuation of applicant's application Ser. No. 81,980, filed Oct. 19, 1970, entitled "Thickening Apparatus", now abandoned.

BACKGROUND OF THE INVENTION

This invention provides improvements in thickening or dewatering devices having particular advantage in application to pulp slurry. It will be so described, though obviously not so limited in application.

In the processing of pulp, fibrous particles are moved through various stages of refining in a liquid vechicle, presenting such particles, in most case, in a high volume, low consistency, slurry flow. In certain stages of refining the slurry must be of a higher consistency than in other stages. This necessitates periodic use of thickening apparatus. There have been many devices of the prior art directed to such purposes, such as vacuum filters which rotate, mechanical screen devices which are vibrated, and screw presses. These devices of the prior art are large in size so that they require considerable space for installation, they are expensive as far as capital investment is concerned and quite costly to operate. In addition to the foregoing disadvantages, their efficiency has been a matter of some concern. A prime area of concern in their use is that they do permit the escape of obnoxious or dangerous fumes.

There are inexpensive screening devices which can be used for dewatering or thickening purposes. However, these have been, in the main, either too large for a given capacity or basically incapable of handling a high volume slurry flow.

Accordingly, the prior art thickening apparatus for the purposes described have not been satisfactorily contrived so as to be able to handle a large flow volume in a minimal amount of space and at a low cost, both from a standpoint of capital investment and operation.

SUMMARY OF THE INVENTION

The present invention provides a solution to the above noted problems. It provides a basically simple, compact, thickening apparatus capable of handling high volume flow and capable of quickly dewatering a pulp or like slurry with a high degree of efficiency. Preferred embodiments of the invention take the form of a duct or series of ducts having an inverted U-shape, the legs of which include separable screen segments affording optimal drain passages, the whole being enclosed in a housing to which and from which extracted effluent moves in a continuing rapid flow.

It is therefore a primary object of the invention to provide thickening apparatus which is more economical to fabricate, more efficient and satisfactory in use, adaptable to a wide variety of application, and unlikely to malfunction.

A further object of the invention is to provide an improved dewatering and thickening apparatus which has no moving parts.

Another object of the invention is to provide an improved thickening apparatus of duct form.

An additional object of the invention is to provide a duct formed thickening device for handling a direct, high volume, low consistency flow with a high degree of separating efficiency.

Another object of the invention is to provide a pulp or like thickener possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a generally diagrammatic cross-sectional view of apparatus according to the invention with wall portions removed to show pertinent detail;

FIG. 2 is a schematic sectional view taken on line 2—2 of FIG. 1;

FIG. 3 shows a section of the screen segments embodied in the device of FIGS. 1 and 2;

FIG. 4 is a view taken on line 4—4 of FIG. 3; and

FIG. 5 is a schematic view of a system embodying the invention concept.

Like parts are indicated by similar characters of reference throughout the several views.

Looking to FIG. 1 of the drawings, as there seen, the invention structure is housed in a vertical shell-like housing 10 having closely spaced front and rear walls 11 and 12 interconnected by side walls 13. In the example illustrated, the top of the shell 10 is provided by a releasable cover plate 14. It is noted that in FIG. 1 the front wall 11 of the shell 10 has been removed to reveal the invention detail.

Referring to FIG. 1, in connection with one side wall 13, at its lower end, is a relatively large diameter conduit 15 which serves to deliver to the interior of the shell 10, by way of an adapter 16, a low consistency pulp slurry. As the adapter 16 passes through the lower end of the side wall 13, a seal is provided thereabout. Within the shell 10 the discharge end of the adapter 16 is gradually modified and reduced in cross section and terminates in the form of a right angled elbow 18. The discharge end of the elbow 18 is flanged and opens vertically upward.

The flanged extremity of elbow 18 connects with and discharges directly to the lower end of one leg 19 of a duct assembly 20. The assembly 20 has an inverted U-shape and is comprised of a pair of closely spaced, generally parallel, vertically oriented duct sections 19 and 21 the upper extremities of which are bridged by an arcuately formed duct segment 22. The latter is formed on a uniform radius. Suitable connections and seals are provided between the respective sections of the duct assembly and their interconnected conduits so as to create what constitutes an integrated continuing flow passage.

In the preferred embodiment of the invention illustrated, it will be seen that use is made of portions of the front and rear walls of the shell 10 in forming the duct assembly 20. Extending between, perpendicular to, and bridging the shell walls 11 and 12, in closely spaced parallel relation, are perforate screen wall units 23. The wall units 23 together with the spanning portions of the shell walls 11 and 12 therebetween mutually form the section 19 of the duct assembly 20. Similarly, the section 21 is formed by a pair of screen wall units 24 extending between, perpendicular to, and bridging the shell walls 11 and 12 in closely spaced parallel relation. To complete the duct assembly 20 and form the section 22 thereof, the screen wall units 23 and 24 most adjacent are interconnected by an imperforate arcuate plate 29 while the most remote of the screen wall units 23 and 24 are interconnected at their upper extremities by an imperforate arcuate plate unit 30. The plate units 29 and 30 extend from the front wall 11 to the rear wall 12 of the shell 10 and form therewith an imperforate arcuate segment 22 of the duct assembly 20. Note that the cross sectional area of the passage through the various segments of the duct assembly 20 is essentially uniform, and screen walls basically consist of a frame releasably retaining one or more screen segments. The nature of the frame and the manner of mechanical insertion and release of the frame segments is not shown or discussed in detail since such is not per se essential to an understanding of the invention. Such mechanical construction features are within the capability of any mechanic having the basic invention before him. However, it is basic to the invention that the screen walls do have readily releasable screen segments which facilitate accessibility to the various portions of the duct assembly for inspection, flushing and any other purpose that might be required. As to the nature of the screen segments per se, a particular type of screen formation providing particular type of apertures is preferred in accordance with the invention such as illustrated in the drawings. As there seen, a rectangular screen segment or insert, one or more of which would be incorporated to form a screen wall 23 or 24, comprises outer bars 26 which in mounted position are vertically oriented and transversely spaced between the front and rear walls 11 and 12 of the shell 10. The bars 26 constitute supports for transversely extending vertically spaced wires or bars 27 of a distinctive wave-line form. The wires 27 are closely spaced and form interior flow surfaces for a slurry moving through the vertical legs of the duct assembly 20, in which flow surfaces are defined arcuate slots. The bars 27 are so arranged to form between each successive pair of vertical bars 26 a single generally uniform arc the apex 28 of which is in any case directed in the sense of flow through the duct assembly 20. This means that within the duct section 19 the apex 28 between adjacent bars 26 is in each case projected upwardly. Correspondingly, within the duct section 21 each apex will be directed in a sense downwardly.

In the lower end of the shell 10 the duct section 21 discharges to and through a conduit 31 of an imperforate tubing. The latter is projected through the bottom of the shell 10, a suitable seal being provided thereabout. Of course, there is a sealed interconnection between the mating ends of the duct section 21 and the conduit 31.

As diagrammatically shown in FIG. 1, the bottom 32 of the shell 10 has a hopper shape, there being provided in its dependent apex a valve controlled drain opening 33. As will be further described, the hopper type bottom 32 serves to accumulate effluent extracted in movement of a slurry through the duct assembly above described. By suitable control of the drain opening 33 one may control the speed of evacuation of the effluent. It will be preferably provided that the bottom 32 have a releasable interconnection with the remainder of the shell 10 so it may be quickly and easily removed and/or replaced, as and when needs require.

The walls 13 of the shell 10 are provided at various elevations with access plates 34. These may be released for inspection purposes or access to the removable screen segments for removal, replacement, flushing, or any other utilitarian purpose.

The construction of the pulp thickening apparatus above described is that basic and free of any part which must positively act to function that it is extremely simple to fabricate, install and maintain. As will further appear, the efficiency of the unit and the system thus provided is optimal.

Reference is now had to FIG. 5 of the drawings which shows schematically, and only to the extent necessary, a type of system in which the above described apparatus may be effectively employed. There seen, represented in generally schematic block form, is a receptacle 35 which may be utilized as a device for receiving dry broke and similar basic materials converted to a slurry form of low consistency. Note that water or other liquids extracted from the system are used as makeup water to insure the initially required low consistency of the slurry provided. From the receptacle 35 this low consistency slurry will pass, for example, through various types of mixtures, pulpers and other refining equipment. At one point or another, such as for storage or preparation for use in end products, the existing low consistency slurry must be converted to a high consistency form. For purposes of illustrating use of the invention, the slurry is shown to be passed through a variable speed screw feeder 37 to the shell 10. The feeder 37 produces a pressured low consistency, high volume, flow to and through supply conduit 15 and adapter 16 to the duct assembly 20 in the shell 10. The adapter 16 is formed to convert the cross section of the slurry flow to correspond to that of the duct assembly.

As noted, in the preferred embodiment illustrated, on entry to the duct assembly 20 the cross section of the flow is modified. In one preferred embodiment such as here illustrated the duct section 19 will be formed to have its screen walls 23 spaced apart in the neighborhood of 1.25 inches while the width of the screen walls will be 24 inches. Thus, as the low consistency slurry is pressured to flow upwardly of the duct section 19, over 95% of the duct surface area over which it passes is of screen form. Accordingly, in the use in particular of the screen form preferred, previously described, the slurry as it moves upwardly of the duct section 19 will be optimally exposed to contact with the screen bars 27 and the single curved sections thereof between their support bars 26. The unique result is that liquid from the slurry tends to follow and cling to the surfaces of the individual curved sections of bars 27 and be expressed to a considerable degree between vertically spaced adjacent of such sections, particularly in the area of their apex portions 28. This tendency of liquid to move outwardly of the duct section 19 under the influence of the bars 27 over which the slurry passes is assisted by the pumping pressure and back pressure which is imposed upon the system. It is noted that the configuration of the arcuate segments of the bars 27 which terminate in upwardly directed apex portions 28 in duct section 19 influence a liquid flow and extraction of a nature that induces a self-cleaning action on the bars. This of course insures the optimal movement of the low consistency slurry and rapid thickening thereof in transit. It also enhances the ability of the invention thickener to handle an extremely high capacity flow in a unit time. In the flow, referring to FIG. 5 of the drawings, there will not only be a reactant back pressure due to gravity as the slurry moves up the duct section 19 but the system contemplates that the discharge conduit from the pulp thickener have incorporated therein a valve control device 38 such as illustrated in U.S. Pat. No. 3,460,466. The latter can be controlled in an obvious manner to assist in dictating the particular degree of extraction of liquid in the thickening procedure.

The duct section 22 is deliberately made as an imperforate 180° curve to facilitate rapid and unimpeded movement of thickened slurry from the duct section 19 to the duct section 21. As the slurry moves down the duct section 21, the bars 27 forming the inner screen wall surfaces of the screen walls 24 function as in the first instance to direct fluid to adhere thereto and to pass outwardly of the walls 24 in a rapid and most effective manner. The passage of the thickened slurry through the duct section 21 is facilitated by the influence of gravity which adds to the effect of the pressured feed. Of course, the back pressure may be controlled by the valve 38 to achieve added extraction of liquid and the desired end result.

The liquid effluent which is efficiently and rapidly expressed from the duct assembly 20 in passage through the sections 19 and 21 as described, will flow down the back sides of the screen walls, concentrated in the area of the apices 28 of the bars 27, to accumulate in the shell bottom 32 and to drain through the device 33 in a manner as dictated by the control of the latter. As schematically illustrated, it will be seen that this effluent is channelled to a supply pit from which the same may be drawn by a pump 40 to be supplied as makeup water. Further noting FIG. 5, the thickened slurry which is now of considerably higher density may be moved to a storage chamber 41 and fed from there to any one of a number of devices, as required. Such devices might be presses, refiners, paper or board forming machines, deckers, filters, and the like which are variously utilized in the pertaining systems.

It will be realized, of course, that the illustration of FIG. 5 is quite skimpy in character and arbitrarily set up to indicate only the basic function of the invention apparatus.

While a preferred construction and cross section of the duct assembly 20 has been here described, due to the optimal function thereof, the invention nevertheless contemplates parallel use of duct assemblies of different cross sectional configuration and use of screen walls or screen segments wherein the apertures are differently formed.

As has been set forth, the invention provides a simple thickener which embodies no moving parts. Moreover, the thickener has been shown housed in a manner admirably suited for treatment of fibrous material in slurry form, particularly where it may be desirable to avoid exposure of the fibrous materials to atmosphere for any reason. In any case the thickener concept affords excellent facilities for removal of liquids from solids in any flow medium. The compact design and the facility with which the invention structure may be used to extract liquid enables a device which occupies a minimal space but is nevertheless capable of handling a high volume flow in a unit time.

Note is also made that it should be obvious that one may use a series of inverted U-shaped duct assemblies fed by separate conduits 15 leading from a main feed manifold. Another possibility is that there may be provided within a shell such as 10 a successive series of inverted U-shaped duct units connected in series relation in an obvious manner. In any event, the basic concept of the thickening apparatus of the invention can be used in various shape and form without departing from the spirit or the scope of the invention. As noted previously, the ducts can be made in tubular form and the character of the perforations in the screen wall sections may be varied to suit particular application.

In summary, in the function and use of the described thickening device the object in any case will be to reduce the slurry comprised of liquids and solids to a higher consistency form. The importance of the invention will become even more self-evident when it may be considered that a unit of the character here illustrated may be used, for example, as an inexpensive anti-pollution device. As such, it may be applied to sewage to extract objectional constituents. Also high on the usage list would be the potential of the application of the invention concept for classification purposes.

The invention system basically provides incoming slurry delivered under pressure to move through a duct assembly wherein flow is essentially in a continuing line path and there is no contrived, devious or helical path followed that would create unnecessary friction or turbulence in the flow. With the preferred screen segments illustrated, the unusual effect is to insure that as slurry moves upwardly and downwardly of the screen wall portions liquid will by wall attachment follow the form of the transversely disposed arcs of the screen bars to move between the vertical supports in an optimal expression and exit of liquids, the exiting liquids flowing down the outermost wall surfaces of the screen segments in an unimpeded flow running clear and clean of the vertical support bars.

One further point of interest in the particular inverted U-shaped duct assembly 20 here illustrated is that as thickened slurry moves through the imperforate 180° elbow provided by duct section 22 there is essentially no retarding action, and the energy requirement for maintaining flow volume to and through the duct section 21 is thereby minimized.

While the thickening unit has been shown in a preferred vertical orientation, for certain applications the orientation might vary. Nevertheless, the vertical orientation is one of primary importance.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

I claim:

1. A thickener in a system flowing solids in a slurry form under pressure and in a relatively large volume, said thickener being enclosed to express fluids under conditions of non-exposure to the atmosphere by a housing having lower and upper ends and providing at the lower end an inlet and an outlet and a drain for expressed fluids, a relatively thin slurry being admitted to said housing by way of said inlet and discharging in a thickened form from said outlet, said thickener including a continuous unobstructed duct structure within said housing including vertically oriented up and down duct sections communicating at respective lower ends with said inlet and said outlet and comprising screen walls in relatively closely spaced approximately parallel relation bridged at their lateral extremities by short interconnecting walls to provide for the slurry to move therein in a thin sheet-like flow, said vertical duct sections extending upwardly within the housing toward the upper end thereof and having adjacent of their ends to one end thereof interconnected by an imperforate generally arcuate duct section which provides for a direction reversing continuous slurry flow from one to the other of the vertical sections of said duct, slurry flow through a part of said duct being opposed by gravity forces, and portions of said vertical duct sections being perforate for an expression of fluids into said housing, expressed fluids flowing to said drain and exiting from said housing thereby.

2. A thickener according to claim 1, wherein said short interconnecting walls are provided by wall portions of said housing, and said imperforate arcuate duct section is formed in part by wall portions of said housing.

3. Dewatering and thickening apparatus particularly applicable to a pulp slurry comprising a continuous duct including a plurality of generally vertically oriented sections arranged in adjacent, relatively closely spaced relation, with each of said sections being connected to the adjacent of said sections by an arcuate duct section, said duct sections being unobstructed and forming thereby a smoothly continuing flow path for use in separating the components of a slurry comprised of liquids and solids which is flowed therethrough under pressure, said vertical duct sections embodying wall portions provided by screen structure including means defining apertures which are laterally extended in a sense transverse to flow and arranged thereby to smoothly and quickly separate substantial amounts of liquid from peripheral portions of the slurry flow through the apertures defined thereby.

4. Apparatus as in claim 3 characterized by said arcuate duct section being defined by an imperforate wall structure.

5. Apparatus as in claim 4 characterized by said continuous duct having a housing and extending between an inlet to and an outlet from said housing and said housing providing a receptacle for the liquid which is induced by said screen structure to separate from said slurry flow, and said screen structure being arranged to bridge opposite wall portions of said housing and form, with a portion thereof, said vertical duct sections.

6. Apparatus as in claim 3 wherein said continuous duct is positioned in a housing and extends between an inlet to and an outlet from said housing; and said housing includes oppositely disposed imperforate wall segments and said oppositely disposed wall segments are bridged by spaced plate structures which define therewith said duct sections the configuration of which causes the slurry to move therethrough in a substantially sheet-like flow.

7. Apparatus as in claim 6 characterized by the adjacent of said generally vertically oriented duct sections and their interconnecting arcuate duct section having a U-shape, the bridging plate structures of said vertically oriented sections being generally parallel and closely spaced and including portions defined by said screen structure the apertures of which are defined in part by bar shaped elements arranged transverse to the slurry flow.

8. Apparatus as in claim 3 wherein said continuous duct is positioned in a receptacle defining a housing for said duct, and said vertical duct sections include opposite wall portions which are imperforate, bridged by further opposite wall portions which include said screen structure and dispose in a closely spaced parallel relation to cause said slurry to move thereby in a thin layered flow the thickness of which is a small fraction of its lateral extent.

9. Dewatering and thickening apparatus particularly applicable to a pulp slurry comprising a duct structure defining a continuing flow path, said duct structure including opposite closely spaced approximately parallel wall portions embodying screen-like wall structure, which portions are bridged at their lateral extremities by short relatively widely spaced wall portions to provide a cross section to said flow path inducing the slurry to move therethrough in a fast moving, thin layered, sheet-like flow, the configuration of said screen-like wall structure being such to induce the rapid exit from said duct structure of substantial amounts of liquid from the peripheral portions of said flow.

10. Apparatus as in claim 9 characterized by said duct structure having a housing and said duct structure including sections which in following sequence are alternately inclusive of apertured screen-like wall structure and imperforate and at least the sections inclusive of said screen-like wall structure being sealed in said housing.

11. Apparatus as in claim 10 wherein said duct structure is comprised of at least one portion the length of which has a generally U-shaped configuration comprising vertical leg sections including wall portions embodying said apertured screen-like wall structure and a bridging section the wall portions of which are imperforate.

12. Apparatus as in claim 9 characterized by said closely spaced wall portions including apertured screen like wall structure have the apertures therein laterally extended in a sense transverse to the direction of the slurry flow and of very limited extent in the direction of the slurry flow.

13. Apparatus as in claim 11 characterized by said vertically oriented leg sections including two pair of opposite generally parallel side wall portions, one pair of which is substantially wider than the other and include screen structure comprising closely spaced wire-like bars having relatively widely spaced supports which define therewith arcuate slots arranged transverse to slurry flow, a central portion of each of which slots is projected in the sense of slurry flow.

* * * * *